UNITED STATES PATENT OFFICE.

CHARLES W. GSCHWIND, OF EGG HARBOR CITY, NEW JERSEY.

IMPROVEMENT IN DRY-YEAST COMPOUNDS.

Specification forming part of Letters Patent No. 180,224, dated July 25, 1876; application filed May 9, 1876.

*To all whom it may concern:*

Be it known that I, CHARLES W. GSCHWIND, of Egg Harbor City, Atlantic county, in the State of New Jersey, have invented a new and Improved Dry Yeast, of which the following is a specification:

The object of this invention is to furnish a dry yeast for bread-making which shall be strong and sweet, and will make perfectly sweet bread.

The invention consists in the dry yeast prepared of the ingredients, in the proportions and manner hereinafter set forth.

In preparing this dry yeast, take one gallon of water, bring it to a boil, put into it four ounces of hops, and boil them twenty minutes. Then strain off the liquid and scald one pound of wheat-flour with it, and thoroughly mix it. When the mixture has cooled below the boiling-point, mix with it one quart of malt, half an ounce of sugar, and one scruple of ginger, and let it stand in a wooden or other suitable vessel until it is only lukewarm. Place the vessel containing the mixture in a warm place, and in three or four days a natural fermentation will take place, and the yeast become ripe for use; or the fermentation may be more rapidly produced by the introduction of about six ounces of the dry yeast, the same being previously soaked in a little warm water.

The second operation is as follows: Take rice-flour and wheaten middlings, in the proportions of two parts of rice-flour and one part of wheaten middlings, mix them together, and work enough of the mixture into the wet yeast to make a stiff dough. Let the dough rise until well ripe, which is known by the sinking down of the dough, which has been rising and bursting in every direction. Then work down the dough with some more of the rice-flour and wheaten-middlings mixture, so as to make it stiff and fit to handle, roll it out into thin sheets, dry it, and it is ready for market.

Any other coarsely-ground cereal may be used instead of the wheaten middlings, or the rice-flour may be used alone. The effect of the rice-flour is to cause the mass to dry quickly, and without souring, and make a perfectly sweet yeast, that may be easily soaked for mixing dough.

The dry yeast which has been made in the manner above described is preferably used by me afterward to bring on fermentation in subsequent batches of yeast.

Having thus described my invention, what I claim as new, and desire to secure by Letters Patent, is—

A dry-yeast compound, consisting of boiled hops, scalded wheat-flour, malt, sugar, ginger, rice-flour, and middlings, in about the proportions specified.

CHARLES WILLIAM GSCHWIND.

Witnesses:
    F. S. REGENSBURG,
    H. BOHLMAN.